(12) United States Patent
Greening et al.

(10) Patent No.: US 8,575,896 B2
(45) Date of Patent: Nov. 5, 2013

(54) PARALLEL BATTERY ARCHITECTURE WITH SHARED BIDIRECTIONAL CONVERTER

(75) Inventors: Thomas C. Greening, San Jose, CA (US); William C. Athas, San Jose, CA (US); P. Jeffrey Ungar, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 616 days.

(21) Appl. No.: 12/555,968

(22) Filed: Sep. 9, 2009

(65) Prior Publication Data
US 2009/0325056 A1    Dec. 31, 2009

Related U.S. Application Data

(63) Continuation-in-part of application No. 12/032,513, filed on Feb. 15, 2008.

(51) Int. Cl.
*H02J 7/00* (2006.01)
(52) U.S. Cl.
USPC .......................... 320/126; 320/140; 320/121

(58) Field of Classification Search
USPC .................................. 320/121, 117, 126, 140
See application file for complete search history.

(56) References Cited

U.S. PATENT DOCUMENTS

| | | | |
|---|---|---|---|
| 5,539,297 A * | 7/1996 | Fiebig | 320/126 |
| 2004/0027101 A1* | 2/2004 | Vinciarelli | 323/259 |
| 2004/0135545 A1* | 7/2004 | Fowler et al. | 320/118 |
| 2008/0157732 A1* | 7/2008 | Williams | 323/266 |
| 2010/0289447 A1* | 11/2010 | Dobson et al. | 320/101 |
| 2011/0140526 A1* | 6/2011 | Weidenheimer et al. | 307/71 |

* cited by examiner

*Primary Examiner* — Patrick Ryan
*Assistant Examiner* — Lucas J. O'Donnell
(74) *Attorney, Agent, or Firm* — Park, Vaughan, Fleming & Dowler LLP; Chia-Hsin Suen (57) ABSTRACT

Some embodiments provide a system that provides a power source. The power source includes a set of cells and a main power bus configured to connect the set of cells in a parallel configuration. The power source also includes a bidirectional converter configured to connect to one cell from the set of cells at a time. Finally, the power source includes a set of switches configured to switch each cell in the set of cells to one of the main power bus and the bidirectional converter.

19 Claims, 5 Drawing Sheets

FIG. 5

PARALLEL BATTERY ARCHITECTURE WITH SHARED BIDIRECTIONAL CONVERTER

RELATED APPLICATION

This application is a continuation-in-part application of a pending U.S. application, entitled "Power Source Having a Parallel Cell Topology," by inventors Thomas Charles Greening, Bill Athas, and Steve Charles Michalske, Ser. No. 12/032,513, filed 15 Feb. 2008. This application hereby claims priority under 35 U.S.C. section 120 to the above-listed patent application.

BACKGROUND

1. Field

The present embodiments relate to power sources for electronic devices. More specifically, the present embodiments relate to a parallel battery architecture with a shared bidirectional converter.

2. Related Art

Typical high-powered battery designs include battery packs that contain battery cells connected in various series and parallel combinations. For example, a six-cell battery pack of lithium cells may be configured in a three in series, two in parallel (3s2p) configuration. If a single cell can provide a maximum of three amps with a voltage ranging from 2.7 volts to 4.2 volts, then the battery pack may have a voltage range of 8.1 volts to 12.6 volts and provide 6 amps of current.

However, existing battery pack architectures have a number of drawbacks. First, a cell's state-of-charge or capacity may be difficult to calibrate. The best technique for determining state-of-charge is to measure the cell's open circuit voltage, which often correlates well, after temperature correction, with the state-of-charge for typical cell chemistries. However, open circuit voltage measurements may only be accurate when the pack is not being charged or discharged, which can be difficult for battery packs that discharge a small amount of current when at rest. In addition, calibration of the battery's capacity may require the user-initiated action of periodically resting the battery at different states of charge.

A second disadvantage relates to cell balancing. In any series configuration of cells, it is important that all cells be at the same state-of-charge (e.g., balanced). An imbalanced battery pack may have reduced capacity, because the cell with the highest state-of-charge terminates the charging cycle and cells with lower state-of-charge never get fully charged. When discharged, the cell with the least charge disables the pack, even if charge remains in other cells. Many cell-balancing techniques exist, but these techniques often rely on either accurate cell impedance measurements or accurate state-of-charge measurements. Battery packs identified as too far out of balance are typically identified and disabled, thus leading to reduced pack lifetime. A number of factors may further contribute to cell imbalance, such as differences between the aging characteristics of cells and/or uneven temperature distribution within the battery pack.

A third disadvantage of standard battery packs relates to the inefficient conversion of power from one DC voltage to another. Most voltages required in modern computing devices are much lower than the voltage provided by battery packs configured in series. Moreover, conversion of the battery pack voltage to the lower required voltages using buck converters and/or other down conversion techniques typically achieves 95% efficiency or worse. Note that buck converter efficiency may be related to the amount of decrease in voltage required, so battery packs with a series configuration and high voltages may waste significant power in converting to much lower voltages and higher currents.

Hence, what is needed is a battery pack topology that allows for accurate calibration of cells, improves battery lifetime, and avoids issues associated with cell balancing.

SUMMARY

Some embodiments provide a system that provides a power source. The power source includes a set of cells and a main power bus configured to connect the set of cells in a parallel configuration. The power source also includes a bidirectional converter configured to connect to one cell from the set of cells at a time. Finally, the power source includes a set of switches configured to switch each cell in the set of cells to one of the main power bus and the bidirectional converter.

In some embodiments, the bidirectional converter corresponds to a buck-boost converter.

In some embodiments, the buck-boost converter includes an inductor and four field-effect transistors (FETs).

In some embodiments, switching a given cell in the set of cells from the main power bus to the bidirectional converter involves:
(i) servoing a cell-side voltage of the cell to a voltage of the main power bus;
(ii) simultaneously connecting the cell to the main power bus and the bidirectional converter; and
(iii) disconnecting the cell from the main power bus.

In some embodiments, switching a given cell in the set of cells from the bidirectional converter to the main power bus involves:
(i) servoing a cell-side voltage of the cell to a voltage of the main power bus;
(ii) simultaneously connecting the cell to the main power bus and the bidirectional converter; and
(iii) disconnecting the cell from the bidirectional converter.

In some embodiments, the bidirectional converter is further configured to perform at least one of:
(i) charging the cell;
(ii) discharging the cell;
(iii) isolating the cell; and
(iv) facilitating the calibration of the cell.

In some embodiments, the calibration involves at least one of calibrating a state-of-charge of the cell and calibrating a capacity of the cell.

In some embodiments, calibrating the state-of-charge involves measuring an open circuit voltage of the cell.

In some embodiments, the set of switches is further configured to disconnect one or more of the cells from the main power bus and the bidirectional converter.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Embodiments provide a battery architecture with multiple cells in a parallel configuration. A main power bus may connect the cells in a parallel configuration, while a set of switches may switch one cell at a time from the main power bus to a single, shared bidirectional converter. The switches may additionally disconnect unhealthy cells from both the main power bus and the bidirectional converter. The battery architecture may thus enable controlled charging, discharging, and/or isolation of one cell at a time by the bidirectional converter while efficiently charging or discharging the remaining cells via the main power bus.

Figure 1:
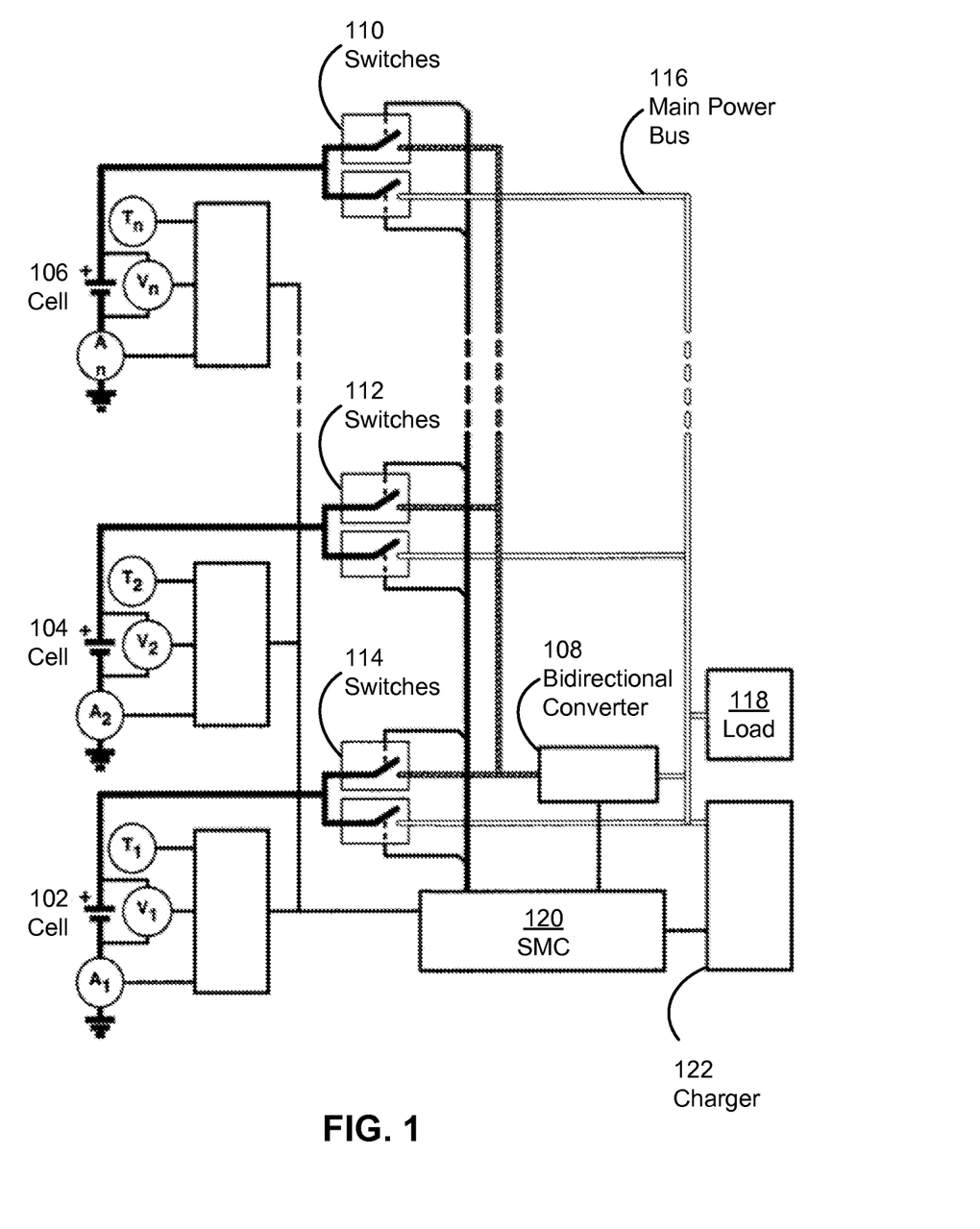
FIG. 1 shows a schematic of a system in accordance with an embodiment.

FIG. 1 shows a schematic of a system in accordance with an embodiment. The system may provide a power source to a portable electronic device, such as a mobile phone, laptop computer, portable media player, and/or peripheral device. In other words, the system may correspond to a battery pack for a portable electronic device. As shown in FIG. 1, the system includes a number of cells 102-106, a bidirectional converter 108, a set of switches 110-114, and a main power bus 116.

In one or more embodiments, cells 102-106 are connected in a parallel configuration with one another using main power bus 116. Each cell 102-106 may include a current-measuring device, such as the current-measurement blocks $A_1$, $A_2$ and $A_n$ illustrated in FIG. 1. In one embodiment, these current measurement blocks $A_1$, $A_2$ and $A_n$ include a sense resistor to measure the associated cell's current. Each cell 102-106 may also include a temperature sensor, such as the temperature sensors $T_1$, $T_2$ and $T_n$ illustrated in FIG. 1. For example, the temperature sensors $T_1$, $T_2$ and $T_n$ may be implemented using a thermistor. Similarly, each cell 102-106 may include a voltage sensor, such as the voltage sensors $V_1$, $V_2$ and $V_n$ illustrated in FIG. 1. Note that by knowing the current, temperature and voltage for each cell, it is possible for a battery "gas gauge" mechanism to determine the cell's state-of-charge, impedance, capacity, charging voltage, and/or remaining charge.

Cells 102-106 may also be connected, one at a time, to bidirectional converter 108 using switches 110-114. For example, cells 102-106 may be connected to bidirectional converter 108 in a round-robin fashion, or an individual cell 102-106 may be isolated from the other cells through a connection with bidirectional converter 108. As explained below, the switching of a single, shared bidirectional converter 108 among multiple cells 102-106 of a power source may improve efficiency, space savings, and/or cost in comparison to serial battery topologies and parallel battery topologies that utilize multiple dedicated bidirectional converters.

In one or more embodiments, bidirectional converter 108 corresponds to a buck-boost converter. Alternatively, bidirectional converter 108 may correspond to another type of DC-DC converter, such as a boost-buck converter, a Ćuk converter, and/or a single ended primary inductor converter (SEPIC). Bidirectional converter 108 may be connected to a system microcontroller (SMC) 120 that controls the operation of bidirectional converter 108. Bidirectional converter 108 is discussed in further detail below with respect to FIG. 2.

As mentioned previously, switches 110-114 may connect each cell 102-106 either to main power bus 116 or bidirectional converter 108. The operation of switches 110-114 may be controlled by SMC 120 and/or another control mechanism associated with the power source. In particular, switches 110-114 may connect one cell 102-106 at a time to bidirectional converter 108 and the remaining cells to main power bus 116. As a result, main power bus 116 may enable the efficient charging (e.g., using charger 122) or discharging of the remaining cells while the cell connected to bidirectional converter 108 is controlled by bidirectional converter 108. Furthermore, switches 110-114 may isolate unhealthy cells 102-106 by disconnecting the unhealthy cells from both bidirectional converter 108 and main power bus 116.

To switch a cell from main power bus 116 to bidirectional converter 108, bidirectional converter 108 may be set to servo the cell-side voltage of the cell to a voltage of main power bus 116. Switches 110-114 associated with the cell may then simultaneously connect the cell to both main power bus 116 and bidirectional converter 108. Once the connection to bidirectional converter 108 is complete, the switches may disconnect the cell from the main power bus.

Once the cell is connected to bidirectional converter 108, bidirectional converter 108 may perform a number of operations on the cell. More specifically, bidirectional converter 108 may charge the cell, discharge the cell, isolate the cell, and/or facilitate the calibration of the cell. For example, bidirectional converter 108 may isolate the cell to allow the cell's open-circuit voltage to be accurately measured. The open-circuit voltage may then be used to calibrate the cell's state-of-charge. Along the same lines, bidirectional converter 108 may charge and/or discharge the cell to enable calibration of the cell's capacity without user intervention.

Bidirectional converter 108 may also amplify or reduce the voltage of the cell based on the power demand from a load 118 connected to the power source. More specifically, the power demand of load 118 may fluctuate due to the aggregate power demand of components (e.g., processors, peripheral devices, backlights, etc.) powered by the power source. To respond to changes in power demand from load 118, SMC 120 may modify the behavior of bidirectional converter 108 to adjust the voltage of the cell to which bidirectional converter 108 is connected. For example, bidirectional converter 108 may amplify the voltage of the cell if the voltage of the cell is less than the power demand of load 118. On the other hand, bidirectional converter 108 may reduce the voltage of a cell connected to bidirectional converter 108 if the voltage of the cell is greater than the power draw of load 118.

To switch a cell from bidirectional converter 108 back to main power bus 116, bidirectional converter 108 may again be set to servo the cell-side voltage of the cell to the voltage of main power bus 116. Switches 110-114 associated with the cell may then simultaneously connect the cell both to main power bus 116 and bidirectional converter 108. Finally, the cell may be disconnected from bidirectional converter 108 upon fully connecting the cell to main power bus 116.

A round-robin approach that continuously monitors the states-of-charge and capacities of cells 102-106 may begin by connecting cell 102 to bidirectional converter 108 using switches 114. While connected to cell 102, bidirectional converter 108 may isolate cell 102 to facilitate calibration of the cell's state-of-charge, or bidirectional converter 108 may charge or discharge cell 102 to facilitate calibration of the cell's capacity. After bidirectional converter 108 finishes operating on cell 102, cell 102 may be disconnected from bidirectional converter 108 and connected to main power bus 116 using switches 114.

The round-robin approach may then proceed to connect cell 104 with bidirectional converter 108 using switches 112. After cell 104 is connected to bidirectional converter 108, bidirectional converter 108 may perform a number of operations for facilitating the calibration of cell 104. Upon completion of the operations, switches 112 may disconnect cell 104 from bidirectional converter 108 and reconnect cell 104 to main power bus 116.

Finally, the round-robin approach may connect cell 106 with the bidirectional converter 108 using switches 110. After cell 106 is switched to a connection with bidirectional converter 108, bidirectional converter 108 may perform a number of operations to facilitate the calibration of cell 106. After bidirectional converter 108 finishes with the operations, switches 110 may disconnect cell 106 from bidirectional converter 108 and reconnect cell 106 to main power bus 116. The round-robin approach may then repeat to maintain a continuous assessment of the states of cells 102-106.

In other words, the round-robin approach described above may continuously and accurately monitor the state of each cell 102-106 without user intervention or user-specified behavior. In particular, the isolation and control of individual cells by bidirectional converter 108 may facilitate the calibration of the cells' states-of-charge and capacities. Voltage amplification and/or reduction by bidirectional converter 108 may further allow the power source to respond to changes in the power demand of load 118.

In addition, the use of a single bidirectional converter 108 for multiple cells 102-106 may provide a number of improvements over a power source that utilizes a dedicated converter for each cell. First, cells connected to bidirectional converters may achieve 95% efficiency or worse. On the other hand, cells that are connected to main power bus 116 (e.g., not connected to bidirectional converters) may supply power with near-total efficiency, subject to the resistance of switches 110-114. As a result, the switching of a single, shared converter (e.g., bidirectional converter 108) between multiple cells may be more efficient than the use of a separate converter for each cell because the single converter only reduces the efficiency of one cell at a time, while the coupling of cells to separate converters constantly reduces the efficiency of all cells.

High-efficiency converters may additionally require large inductors and/or field-effect transistors (FETs). Such high-efficiency converters may both take up board space within the power source and increase costs associated with fabricating the power source. Space and cost issues may further be aggravated by the use of multiple high-efficiency converters within a single power source. Thus, the use of a single, shared bidirectional converter for multiple cells may increase board space, facilitate design flexibility, and reduce cost over the use of a dedicated converter for each cell.

Figure 2:
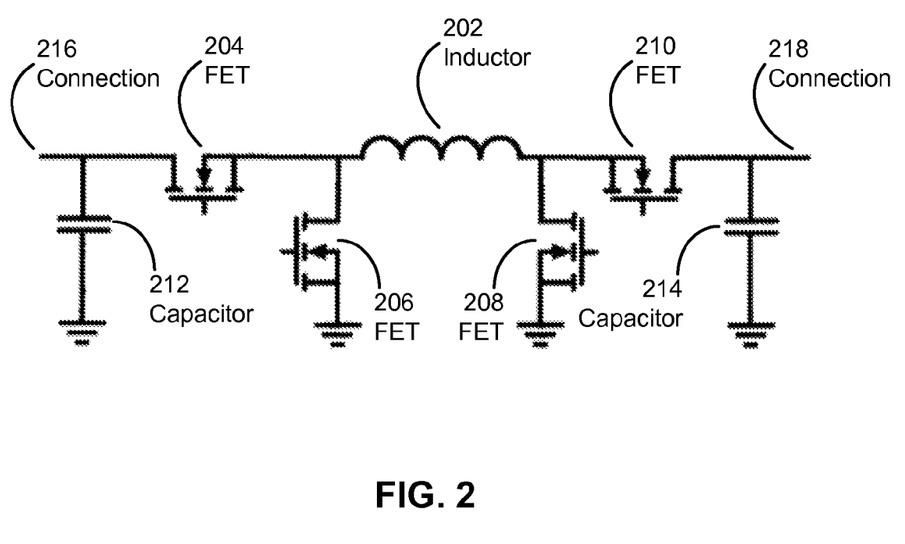
FIG. 2 shows a buck-boost converter in accordance with an embodiment.

FIG. 2 shows a buck-boost converter in accordance with an embodiment. As shown in FIG. 2, the buck-boost converter includes an inductor 202, four FETs 204-210, and two capacitors 212-214. The buck-boost converter may correspond to a bidirectional converter (e.g., bidirectional converter 108 of FIG. 1) that is coupled to one cell from a set of cells (e.g., cells 102-106 of FIG. 1) at a time through a connection 216 with the cell. The buck-boost converter may also be coupled to an output voltage through a connection 218 with the output voltage.

While connected to the cell, the buck-boost converter may perform a number of operations on the cell. In particular, the buck-boost converter may allow for increased control of both discharging and charging of the cell. For example, a discharging cell may have a lower voltage than the output voltage. As a result, the buck-boost controller may enter a boost mode to amplify the voltage of the cell. To enter the boost mode, FET 204 is turned on and FET 206 is turned off. Additionally, FETs 208-210 may switch, as necessary, to drive current from the cell to the output voltage. When FET 204 is on, the cell may be connected to inductor 202. Furthermore, when FET 204 is on, current may be allowed to flow between the drain of FET 204 and the source of FET 204. As a result, the connection of the cell to inductor 202 may increase the current of inductor 202 and result in the accumulation of power in inductor 202. In this state, capacitor 214 may also supply charge to the output voltage.

On the other hand, a discharging cell may have a higher voltage than the output voltage. To reduce the voltage of the cell, the buck-boost converter may enter a buck mode, in which FET 210 is on, FET 208 is off, and FETs 204-206 switch as necessary to drive current from the cell to the output voltage. When FET 210 is on, current may be allowed to flow between the drain of FET 210 and the source of FET 210. In addition, the inductor 202 current may have no path to ground through FET 208. In this state, capacitor 214 may supply charge to the output voltage.

Furthermore, the buck-boost converter may enter a reverse-buck mode as the cell is charging. In reverse-buck mode, the output voltage may be higher than the voltage of the cell. The reverse-buck mode may be similar to the boost mode with the exception of current flow from connection 218 to connection 216 (e.g., to charge the cell) instead of from connection 216 to connection 218 (e.g., to discharge the cell). In reverse-buck mode, FET 204 is turned on and FET 206 is turned off, while FETs 208-210 may switch to drive current from the output voltage to the cell. Furthermore, capacitor 212 may supply power to the cell.

Finally, the buck-boost converter may isolate the cell from a main power bus (e.g., main power bus 116 of FIG. 1) and/or from the output voltage. To isolate the cell, FET 204 and FET 210 may be turned off. Once the cell is isolated, the cell's open circuit voltage may be accurately measured. The measurement may then be used to calibrate the state-of-charge of the isolated cell. The buck-boost converter may also isolate cells to extend battery runtime. In particular, the buck-boost converter may isolate a cell that is fully discharged or near fully discharged so that other cells in the power source may continue to provide power to the load until all cells are depleted. Alternatively, fully discharged cells may be isolated by disconnecting the cells from both the buck-boost converter and the main power bus using a set of switches (e.g., switches 110-114 of FIG. 1).

Figure 3:
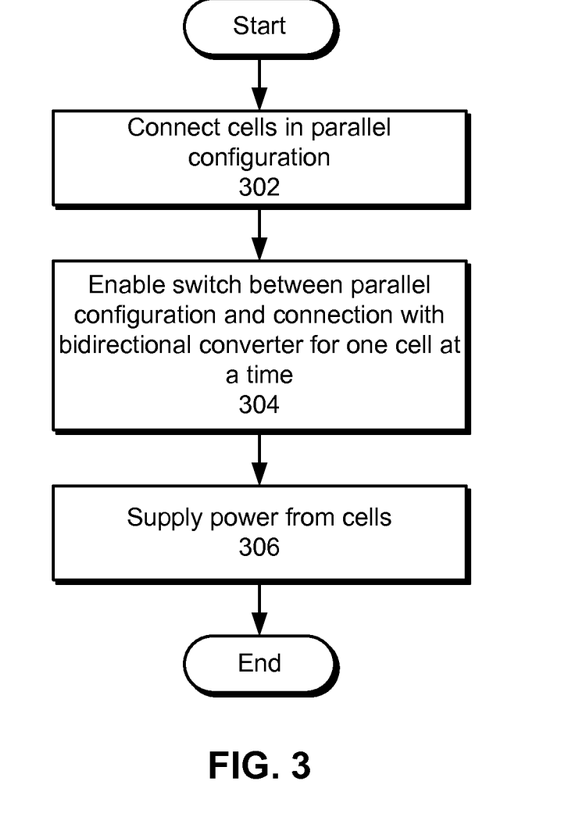
FIG. 3 shows a flowchart illustrating the process of providing a power source in accordance with an embodiment.

FIG. 3 shows a flowchart illustrating the process of providing a power source in accordance with an embodiment. In one or more embodiments, one or more of the steps may be omitted, repeated, and/or performed in a different order. Accordingly, the specific arrangement of steps shown in FIG. 3 should not be construed as limiting the scope of the embodiments.

First, the cells are connected in a parallel configuration (operation 302). The parallel configuration may eliminate cell-balancing issues and allow cells of different capacities to be combined in the power source. Next, a switch between the parallel configuration and a connection with a bidirectional converter is enabled for one cell from the cells at a time (operation 304). For example, the cells may be connected to the bidirectional converter in a round-robin fashion to continuously monitor the state of each cell. Finally, power is supplied from the cells (operation 306). The power may be supplied to a portable electronic device, such as a laptop computer, mobile phone, portable media player, and/or peripheral device. Furthermore, the bidirectional converter may adjust the voltage of the power source based on the aggregate power demand of a number of components in the portable electronic device. For example, the bidirectional converter may adjust the voltage of the power source for a laptop computer as the laptop computer's power demand fluctuates from the increased or decreased use of processors, backlights, peripheral devices, input/output devices, and/or other components in the laptop computer.

Figure 4:
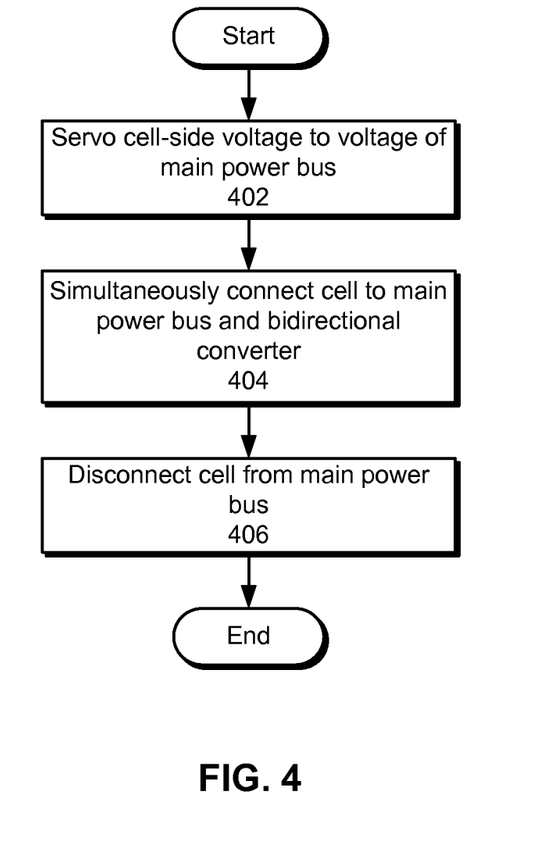
FIG. 4 shows a flowchart illustrating the process of switching a cell in a power source from a main power bus to a bidirectional converter in accordance with an embodiment.

FIG. 4 shows a flowchart illustrating the process of switching a cell in a power source from a main power bus to a bidirectional converter in accordance with an embodiment. In one or more embodiments, one or more of the steps may be omitted, repeated, and/or performed in a different order. Accordingly, the specific arrangement of steps shown in FIG. 4 should not be construed as limiting the scope of the embodiments.

Initially, the cell-side voltage of the cell is servoed to a voltage of the main power bus (operation 402). Next, the cell is simultaneously connected to the main power bus and the bidirectional converter (operation 404). Finally, the cell is disconnected from the main power bus (operation 406) after the cell is fully connected to the bidirectional converter.

Figure 5:
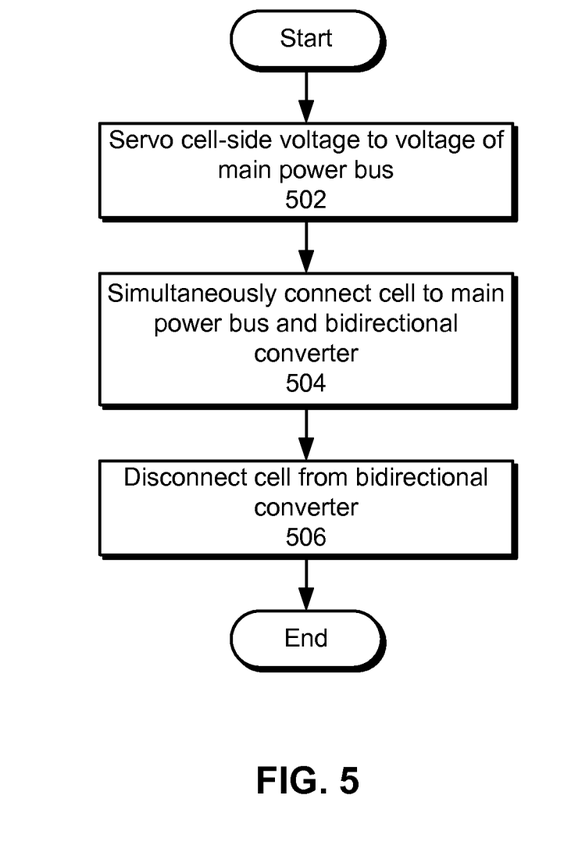
FIG. 5 shows a flowchart illustrating the process of switching a cell in a power source from a bidirectional converter to a main power bus in accordance with an embodiment.

FIG. 5 shows a flowchart illustrating the process of switching a cell in a power source from a bidirectional converter to a main power bus in accordance with an embodiment. In one or more embodiments, one or more of the steps may be omitted, repeated, and/or performed in a different order. Accordingly, the specific arrangement of steps shown in FIG. 5 should not be construed as limiting the scope of the embodiments.

Initially, the cell-side voltage of the cell is servoed to a voltage of the main power bus (operation 502). Next, the cell is simultaneously connected to the main power bus and the bidirectional converter (operation 504). Finally, the cell is disconnected from the bidirectional converter (operation 506) after the cell is fully connected to the main power bus.

ADVANTAGES

As mentioned above, the parallel battery architecture with a single bidirectional converter may provide a number of advantages over other battery architectures. First, by isolating one cell while the other cells continue to provide power to the load, an accurate measurement of the cell's open circuit voltage may be measured. The open circuit voltage may be used to accurately determine the cell's state-of-charge, independent of any previous measurements. Because other cells continue to provide power to the load, the calibration of the state-of-charge may be accomplished without user intervention or user-specified behavior. For example, each cell may be isolated from the load one at a time in a round-robin fashion to calibrate the state-of-charge of each cell. When a cell is providing power to the load or charging, the state-of-charge may be determined using a coulomb-counting technique. Although errors may accumulate in the coulomb-counting technique, the calibration period of the cell is deterministic and prevents state-of-charge errors from ever becoming too large.

Another advantage of the parallel battery topology is that cell balancing is no longer an issue. Cell balancing and imbalance are only concerns when cells are in a series configuration. Because cell balance is no longer required, cells no longer need to be at the same state-of-charge or have the same capacity. In other words, different capacity battery cells and any number of cells may be combined in a pack where the state-of-charge of each cell need not be balanced. Consequently, a designer could choose different sized cells to fill every available space for increased capacity and runtime, or may instead choose to remove cells for reduced weight. For optimal capacity, the only restriction required when cells are put in parallel is that they are nearly chemically identical. In particular, the relationship between the state-of-charge and the rested open circuit voltage is best if all of the cells are similar. If this relationship is not similar, this topology will still work, but the capacity will be suboptimal.

The parallel battery topology also has the potential to extend the battery runtime. First, fully discharged cells can be isolated and/or disconnected from the main power bus while the remaining cells continue to provide power to the load. The battery runtime is consequently extended until the last cell is depleted, as opposed to the standard battery pack, where the pack is disabled once the first cell is depleted.

Another advantage to the parallel pack topology corresponds to DC conversion efficiency. Because the output voltage of the pack is close in voltage to the typically small voltages required in computing devices, less down-conversion is needed for any downstream DC-to-DC buck converter. Because the amount of bucking is inversely proportional to efficiency, a smaller difference in voltage results in more efficient operation and longer runtime.

The single bidirectional converter topology is also more efficient and requires less board space than the all parallel n converter topology (e.g., one converter per cell). In particular, each bidirectional converter may be implemented as a buck-boost converter with four FETs. Within the n converter topology, all power must flow through the converters, which typically achieve 95% efficiency or worse. Improving the efficiency of the buck-boost converter typically requires a lower switching frequency and a larger inductor. Similarly, very large FETs are required for achieving high efficiency at high power. Consequently, a tradeoff between board space and efficiency must be made.

However, the single bi-directional converter topology only requires one bidirectional converter. The cells that do not pass through the converter are nearly 100% efficient. The only inefficiency arises from the on-resistance of the switch connecting the cells to the main power bus. For a cell connected to the bidirectional converter, the efficiency and board space requirements are the same as each cell in the parallel n controller topology, but there is only one converter. For an eight-cell configuration with a 95% efficient converter, the total efficiency is 99.4% efficient, while an eight-cell n converter efficiency would be 95% with eight times the board space requirements as the single converter topology. The additional space required for the 2n switches connecting the cells to the converter and main power bus is still rather small, since these switches do not need to switch quickly and can be implemented with small-sized low on-resistance, high gate capacitance FETs.

To summarize, the single converter all parallel battery topology provides the following advantages:
(i) Automatable state-of-charge calibration by measuring the open circuit voltage without requiring user-initiated action.
(ii) Elimination of cell imbalance and balance requirements.
(iii) Significantly increased design flexibility that allows the designer to fill all available space for increased runtime or eliminate cells for reduced weight. Cells not only can be unbalanced but can be of different capacities by design.
(iv) Increased battery runtime by extending the runtime until the last cell is fully depleted.
(v) Increased efficiency and greatly reduced board space compared to the all parallel n converter topology.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A power source, comprising:
a set of cells;
a main power bus configured to connect the set of cells in a parallel configuration;
a bidirectional converter configured to connect to one cell from the set of cells at a time; and
a set of switches configured to connect one cell at a time through a corresponding switch to the bidirectional converter and connect the remaining cells through corresponding switches to the main power bus.

2. The power source of claim 1, wherein the bidirectional converter corresponds to a buck-boost converter.

3. The power source of claim 2, wherein the buck-boost converter comprises an inductor and four field-effect transistors (FETs).

4. The power source of claim 1, wherein the set of switches are further configured to switch a given cell in the set of cells from the main power bus to the bidirectional converter by:
servoing a cell-side voltage of the cell to a voltage of the main power bus;
simultaneously connecting the cell to the main power bus and the bidirectional converter; and
disconnecting the cell from the main power bus.

5. The power source of claim 1, wherein the set of switches are further configured to switch a given cell in the set of cells from the bidirectional converter to the main power bus by:
servoing a cell-side voltage of the cell to a voltage of the main power bus;
simultaneously connecting the cell to the main power bus and the bidirectional converter; and
disconnecting the cell from the bidirectional converter.

6. The power source of claim 1, wherein the bidirectional converter is further configured to perform at least one of:
charging the cell;
discharging the cell;
isolating the cell; and
facilitating the calibration of the cell.

7. The power source of claim 6, wherein the calibration involves at least one of:
calibrating a state-of-charge of the cell; and
calibrating a capacity of the cell.

8. The power source of claim 7, wherein calibrating the state-of-charge involves:
measuring an open circuit voltage of the cell.

9. The power source of claim 1, wherein the set of switches is further configured to disconnect one or more of the cells from the main power bus and the bidirectional converter.

10. A method for providing a power source, comprising:
connecting a set of cells in a parallel configuration;
configuring a set of switches so that one cell at a time is connected through a corresponding switch to a bidirectional converter and the remaining cells are connected through corresponding switches to a main power bus; and
supplying power from the set of cells.

11. The method of claim 10, wherein the method further comprises switching a cell from the main power bus to the bidirectional converter by:
servoing a cell-side voltage of the cell to a voltage of the main power bus;
simultaneously connecting the cell to the main power bus and the bidirectional converter; and
disconnecting the cell from the main power bus.

12. The method of claim 10, wherein the method further comprises switching a cell from the bidirectional converter to the main power bus by:
servoing a cell-side voltage of the cell to a voltage of the main power bus;
simultaneously connecting the cell to the main power bus and the bidirectional converter; and
disconnecting the cell form the bidirectional converter.

13. The method of claim 10, wherein the bidirectional converter is configured to perform at least one of:
charging the cell;
discharging the cell;
isolating the cell; and
facilitating the calibration of the cell.

14. The method of claim 13, wherein the calibration involves at least one of:
calibrating a state-of-charge of the cell; and
calibrating a capacity of the cell.

15. The method of claim 14, wherein calibrating the state-of-charge involves:
measuring an open circuit voltage of the cell.

16. The method of claim 10, wherein the bidirectional converter corresponds to a buck-boost converter.

17. The method of claim 16, wherein the buck-boost converter comprises an inductor and four field-effect transistors (FETs).

18. The method of claim 10, further comprising:
disconnecting one or more of the cells from the main power bus and the bidirectional converter.

19. A portable electronic device, comprising:
a set of components powered by a power source; and
the power source, comprising:
- a set of cells;
- a main power bus configured to connect the set of cells in a parallel configuration;
- a bidirectional converter configured to connect to one cell from the set of cells at a time; and
- a set of switches configured to connect one cell at a time through a corresponding switch to the bidirectional converter and connect the remaining cells through corresponding switches to the main power bus.

* * * * *